United States Patent [19]

Sketo

[11] Patent Number: 4,822,012
[45] Date of Patent: Apr. 18, 1989

[54] SINGLE SPRING SAFETY STABILIZER FOR VEHICLE STEERING LINKAGE

[75] Inventor: James L. Sketo, Stockbridge, Ga.

[73] Assignee: Sexton Enterprises, Inc., Atlanta, Ga.

[21] Appl. No.: 149,846

[22] Filed: Jan. 29, 1988

[51] Int. Cl.[4] .......................... B60G 11/56; F16F 1/00; B25G 3/02
[52] U.S. Cl. ...................... 267/221; 267/34; 267/150; 280/94
[58] Field of Search ................ 267/34, 71, 66–69, 267/150, 169, 170, 217, 221, 286, 291, 166, 167, 113, 64.26, 121; 280/94

[56] References Cited

U.S. PATENT DOCUMENTS

| | | | |
|---|---|---|---|
| 2,893,470 | 7/1959 | Peller | 267/221 X |
| 2,918,273 | 12/1959 | Whisler et al. | 267/34 |
| 4,406,473 | 9/1983 | Sexton | 267/150 X |
| 4,657,230 | 4/1987 | Weseloh | 267/169 X |
| 4,736,931 | 4/1988 | Christopherson | 267/64.26 X |

FOREIGN PATENT DOCUMENTS 0522734 11/1955 Belgium .......................... 267/64.26

Primary Examiner—Andres Kashnikow
Assistant Examiner—Robert J. Oberleitner
Attorney, Agent, or Firm—Thomas & Kennedy

[57] ABSTRACT

A safety stabilizer for vehicle steering linkages for connection between a fixed portion of the vehicle and a movable element of the steering linkage comprising an outer cylinder and an inner fluid filled cylinder extending longitudinally through one end of the outer cylinder and movable relative thereto. A coil spring is mounted within the outer cylinder surrounding the inner cylinder. Two pairs of spaced apart annular stops affixed to the cylinders cooperate to compress the spring upon longitudinal movement of the fluid filled cylinder in either direction relative to the outer cylinder. A piston and piston rod are movable mounted within the fluid filled cylinder. The piston rod extends through the end of the fluid filled cylinder contained within the outer cylinder and is affixed to the outer cylinder.

13 Claims, 2 Drawing Sheets

SINGLE SPRING SAFETY STABILIZER FOR VEHICLE STEERING LINKAGE

TECHNICAL FIELD

The present invention relates to vehicle steering and, more particularly, to safety stabilizers for vehicle steering linkages.

BACKGROUND OF THE INVENTION

Stabilizers for stabilizing the steering linkage of a vehicle while yieldibly biasing the vehicle wheels toward a straight-ahead direction have been known for some time. Prior art stabilizers typically comprise a fluid damped shock absorber yieldibly biased by one or more biasing springs to an intermediately extended position. The stabilizer usually is connected between a movable portion of a vehicle steering linkage and a fixed portion of the vehicle frame with the straight ahead direction of the vehicle wheels corresponding to the spring biased intermediately extended position of the stabilizer. When the vehicle wheels have been turned resulting in an extension or contraction of the stabilizer and the turning force is removed or dissipated the biasing spring or springs tend to return the stabilizer to its biased position and consequently the wheels to their straight-ahead direction.

Prior art stabilizers, while useful, have several shortcomings. Dual spring stabilizers such as those exemplified in U.S. Pat. Nos. 1,745,117 of Plank, 3,980,315 of Hefren, and 4,406,473 of Sexton may sometimes produce an uneven steering response or recovery because the springs do not have precisely the same spring tension especially after extended use. In addition, dual spring stabilizers are relatively expensive to produce. Prior art single spring stabilizers such as those illustrated in U.S. Pat. Nos. 3,464,688 of Papousek and 3,951,391 of Papousek have a single spring that is compressed upon the vehicle wheels being turned in one direction and extended upon the wheels being turned in the other direction. These stabilizers also result in uneven steering response and recovery because the recovery force of a compressed spring is not the same as its recovery force when expanded. In addition, the single spring does not provide strong biasing forces at the biased position because the spring is under neither tension nor compression when the stabilizer is in that position.

Thus, it can be seen that a steering linkage stabilizer that provides identical biasing forces in either direction, a strong positive biased position, and that is relatively inexpensive to produce would eliminate those problems of prior art devices and, hence, is highly desirable.

SUMMARY OF THE INVENTION

The present invention is a safety stabilizer for vehicle steering linkages comprising a fluid damped shock absorber biased to an intermediately extended position by a single coil spring. The stabilizer is adapted to be connected between a movable portion of the steering linkage and a fixed portion of the vehicle frame such that the vehicle wheels are in their straight-ahead direction when the stabilizer is in its spring biased, intermediately extended position.

When the vehicle wheels are turned in one direction, thereby compressing the stabilizer, the spring is compressed providing a force tending to return the stabilizer to its biased position and consequently to realign the wheels in a straight-ahead direction. When the wheels are turned in the other direction, thereby expanding the stabilizer, the spring is again compressed providing a recentering force in the opposite direction. In addition, when the stabilizer is in its spring-biased position, and the wheels in their straight-ahead direction, the spring is in a slightly compressed state providing a firm biasing force at the biased position of the stabilizer that tends to resist deviation of the vehicle wheels from their straight ahead direction.

Since the spring is compressed upon both contraction and expansion of the stabilizer, the recentering force provided by the spring is substantially identical in either turning direction of the wheels. Moreover, since the spring is under compression at the biased position of the stabilizer, a firm force tending to retain the biased position of the stabilizer and consequently the straight ahead orientation of the wheels is provided. It is thus seen that a safety stabilizer is provided that overcomes the shortcomings of the prior art. In addition, the stabilizer of the present invention is relatively inexpensive to produce when compared to double spring stabilizers as a consequence of its single spring construction.

It is thus an object of the invention to provide a safety stabilizer that provides identical recentering forces in either turning direction of the wheels.

Another object of the invention is to provide a safety stabilizer that provides firm biasing forces at the biased, straight-ahead direction of the vehicle wheels.

Still another object of the invention is to provide a safety stabilizer that is relatively simple and inexpensive to manufacture.

Other objects, features and advantages of the invention will become apparent upon reading the following specification when taken in conjunction with the accompanying drawings.

DETAILED DESCRIPTION

Figure 1:
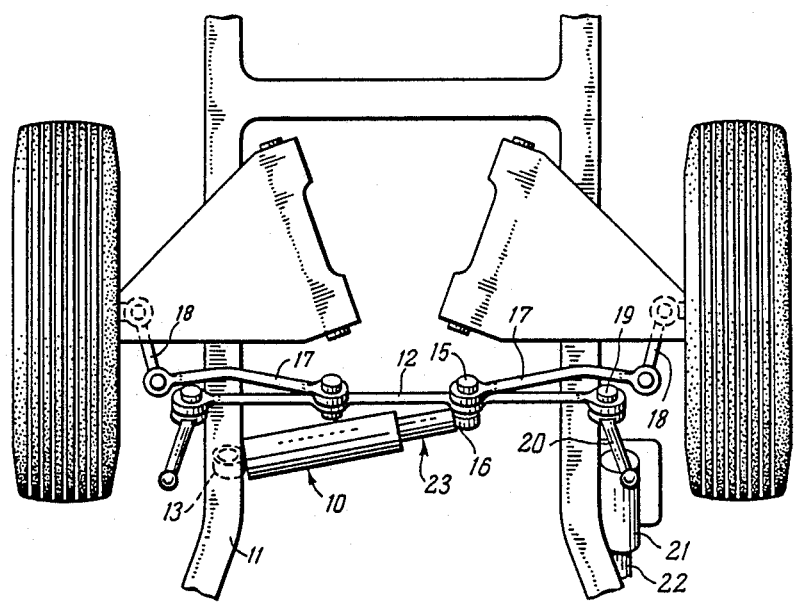
FIG. 1 is a bottom plan view of a vehicle steering mechanism equipped with a stabilizer according to the invention.
Figure 2:
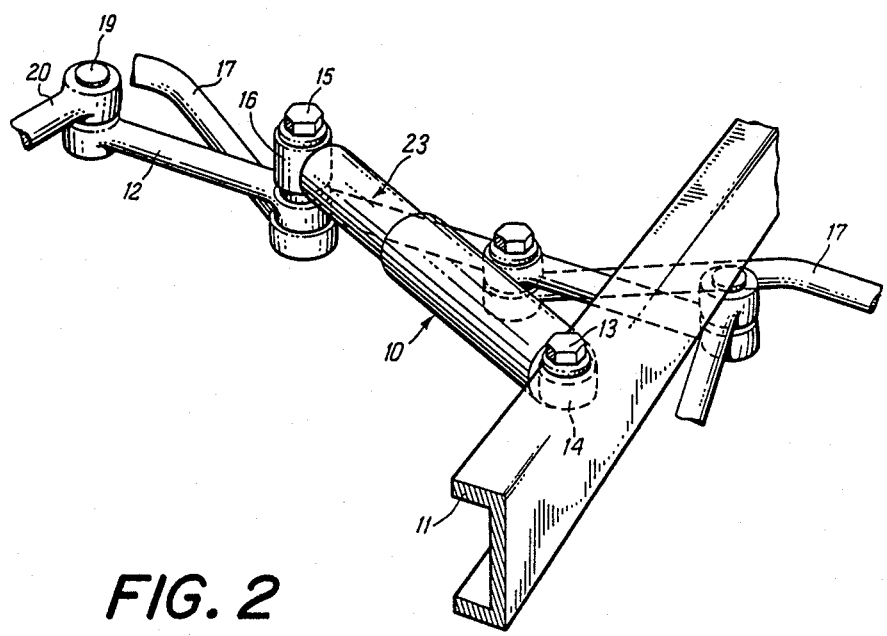
FIG. 2 is an enlarged fragmentary top perspective view of a steering mechanism embodying the principles of the invention.

Referring now to the drawings, wherein like numerals designate like parts throughout the several views, FIGS. 1 and 2 show a vehicle steering mechanism having a safety stabilizer 10 embodying the principles of the invention. The stabilizer 10 is shown connected between a main frame member 11 of the vehicle and a movable portion of the vehicle steering linkage 12. Particularly, a bolt 13 anchors one end of the stabilizer 10 to the frame member 11 by engaging through an eye 14 fixed to one end of the stabilizer 10. The other end of the stabilizer is similarly anchored by another bolt 15 through eye 16 to the steering linkage movable portion 12 at an intermediate point thereon.

The steering linkage 12 is connected through two shorter lengths 17 with steering arms 18 which are in turn connected to the vehicle wheels in a generally conventional manner as depicted in FIG. 1. The steering linkage 12 is also connected at one end by a pin or bolt 19 with the arm 20 of a steering gear 21 operatively connected with the vehicle's steering wheel, not shown through a steering column 22. It can be seen from FIG. 1 that as the wheels turn to either side of their straight ahead direction, the movable portion 12 of the steering linkage moves either to the left or right causing the safety stabilizer 10 to be either compressed or extended.

The described steering linkage is largely conventional and its construction may vary somewhat in different models and types of vehicles. The safety stabilizer 10 is adapted for use with various types of steering linkages, and the invention is not limited to the particular steering linkage shown in the drawings.

Figure 3:
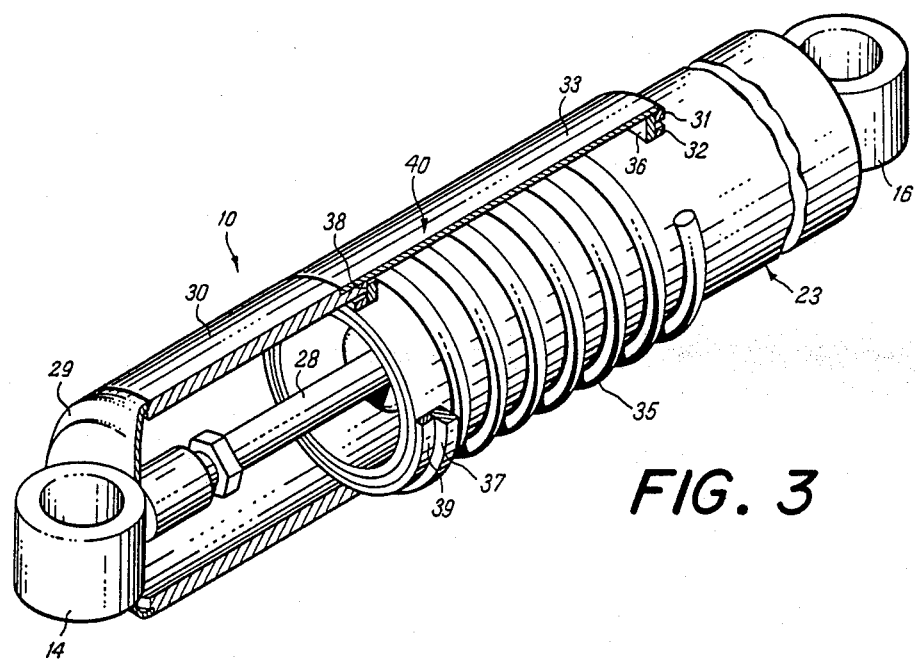
FIG. 3 is a perspective view of the stabilizer, partly in section.
Figure 4:
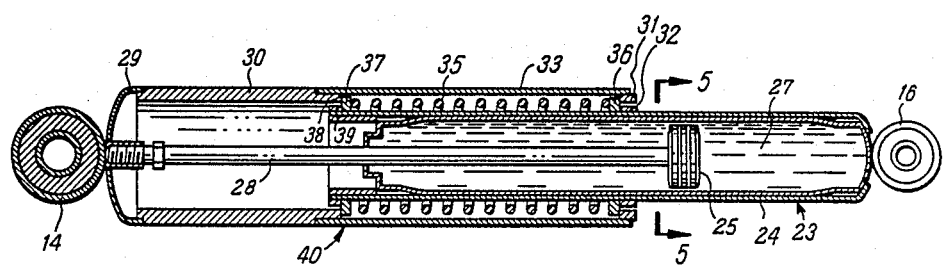
FIG. 4 is a central vertical longitudinal section through the stabilizer.
Figure 5:
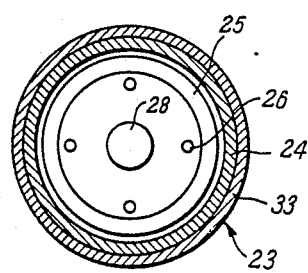
FIG. 5 is a transverse vertical section taken along line 5—5 of FIG. 4.

As shown primarily in FIGS. 3–5, the stabilizer 10 comprises a core element 23 having a cylinder 24 containing a piston 25 normally at substantially the longitudinal center thereof. The piston has axial through ports 26 (FIG. 5) to allow a viscous fluid 27 to flow therethrough with resistance.

The piston 25 is connected to a piston rod 28 that extends through an end of cylinder 24 and is attached to an end plate 29 of a larger cylinder 40 which telescopes over the core element 23 of the stabilizer. Cylinder 40 comprises a first cylindrical portion 30 and a second cylindrical portion 33 with portions 30 and 33 having substantially identical outer diameters. First cylindrical portion 30 has an inner diameter that is less than that of the second cylindrical portion 33 such that an annular projection or stop 38 is formed on the inside of cylinder 40 adjacent the position where the cylindrical portions are joined. The stops 32 and 38 can be positioned along the cylinders 24 and 40 intermediate at their ends as best seen in FIG. 4. Core element 23 extends longitudinally and coaxially through cylinder 40 and is normally positioned such that its end extends slightly beyond the annular stop 38.

An annular projection or stop 39 is attached to the outside of the core element 23 adjacent the inner end thereof such that it normally extends within the region of overlap between the core element and the first portion 30 of the cylinder 40. Annular projection or stop 31 extends inwardly from the bore of cylinder 40 adjacent its open end and annular projection or stop 32 extends outwardly from cylinder 24 such that the stops 31 and 32 are coaxial and concentric when the cylinders 24 and 40 are in their normal positions as shown in FIG. 4. 32 are secured to the bore of cylinder 40 adjacent its longitudinal end and to the exterior of core element 23 respectively such that retaining ring 31 and thrust ring 32 are normal coaxial and concentric as shown in FIG. 4.

A coil spring 35 is contained within the space between the core element 23 and the cylinder 40. The ends of the coil spring bear against movable thrust washers 36 and 37 that normally abut stops 38 and 39 adjacent the central portion of cylinder 40 and stops 31 and 32 adjacent the end portion of cylinder 40.

It may be seen that the described coil spring arrangement renders the core element 23 positive self centering, that is, when under no external load the dampening piston 25 is biased to substantially the longitudinal center of the cylinder 24, as shown in FIG. 4. The stabilizer 10 is typically installed on a vehicle, as shown in FIG. 1, such that the biased or normal position of the stabilizer corresponds to the straight ahead direction of the vehicle wheels. With this arrangement, the spring 35 will tend to bias the stabilizer to its normal position and consequently the vehicle wheels to their straight ahead direction.

Additionally, in accordance with a major objective of the invention, the stabilizer prevents a variety of external forces from being transmitted through the steering linkage to the driver's steering wheel by dampening such forces and transmitting them through the piston rod to the frame of the vehicle. Referring to FIG. 4, when an external force on the vehicle wheels tends to drive cylinder 23 to the left further into the cylinder 40, the resistance provided by the piston 25 moving in the viscous fluid 27 dampens such forces effectively. At the same time, stop 32 pushes the right hand thrust washer 36 to the left and, since left hand thrust washer 37 is restrained by stop 38, the coil spring 35 is compressed to resist further the external forces. When the external force is removed, the coil spring 35 tends to return the cylinder to its normal biased position and in so doing will tend to return the vehicle wheels to their straight ahead direction.

When an external force on the steering linkage caused by a turning of the steering wheel or the effect of uneven terrain on the wheels tends to move cylinder 23 to the right in FIG. 4, stop 39 forces thrust washer 37 to the right again compressing coil spring 35 since thrust washer 36 is restrained by stop 31. The piston 25 moving in the fluid 27 dampens sudden external forces and the coil spring 35 tends to recenter the stabilizer, vehicle steering linkage, and the vehicle wheels to their normal centered or straight ahead positions.

Thus, spring 35 is arranged to center the vehicle wheels when an external force causing the wheels to move from their straight ahead direction is removed or dissipated. Since the same coil spring is used to center the stabilizer in both directions and since the stabilizing force is derived from a compression of the spring in each direction, the centering force provided by the stabilizer is identical in either direction. Further, since the spring is in a compressed state when the stabilizer is in its normal centered position, a firm force is provided by the spring tending to maintain the stabilizer in its centered position and consequently resist deviations of the wheels from their straight ahead direction. In addition, the single spring arrangement is relatively less expensive to manufacture than double spring stabilizers because careful spring matching is not required.

The stabilizer is simple, compact and unitary. It is entirely practical and convenient to install and no cables, turn buckles, external springs or other threaded adjusting means are required. The recentering force provided by the coil spring is identical in both extended and contracted positions of the stabilizer because the spring is compressed in either direction. A firm force is provided by the spring at the centered position of the stabilizer because the spring is in a compressed state when the stabilizer is in that position. Finally, the stabilizer of the present invention is relatively less expensive to manufacture than prior art double spring stabilizers.

Although the invention has been described in the form of a preferred embodiment, many modifications, additions, and deletions may be made thereto. For example, the single spring may be replaced by equivalents thereof such as a plurality of springs in series with, for example, washers between adjacent springs. Other modifications obvious to those of skill in the art can also be made without departure from the spirit and scope of the invention as set forth in the claims.

I claim:

1. A stabilizer for a vehicle steering linkage for connection between a fixed portion of a vehicle and a movable portion of the vehicle steering linkage comprising:
   an elongated outer member;
   an elongated inner member projecting longitudinally through an end of said outer member and being movable relative thereto;
   said inner member including a pair of spaced apart stops projecting outwardly therefrom and said outer member including a pair of spaced apart stops projecting inwardly therefrom, the spacing between said outer member stops being substantially the same as the spacing between said inner member stops, with said inner member stops being configured to be movable past said outer member stops as said inner member moves longitudinally relative to said outer member;
   a compression spring mounted within said outer member about said inner member, said compression spring being longitudinally captured between said inner member stops and said outer member stops;
   a first annular thrust washer means slidably mounted about said inner member between one end of said compression spring and the adjacent inner member and outer member stops and a second annular thrust washer means slidably mounted about said inner member between the opposite end of said compression spring and the adjacent inner member and outer member stops;
   whereby said compression spring normally urges said annular thrust washer means toward engagement with said inner and outer stops and relative movement of said inner and outer members in either longitudinal direction causes longitudinally opposing inner member and outer member stops to move the thrust washers closer together compressing the spring so that the spring resists the relative movement of the inner member and outer member.

2. A stabilizer as claimed in claim 1 wherein said stops are spaced apart a distance less than the length of the compression spring in its non-compressed state and wherein said spring is compressed between said stops whereby said inner member is biased by said spring to a predetermined longitudinal position relative to said outer member with said inner and outer member stops being substantially radially aligned.

3. A stabilizer as claimed in claim 1 further comprising damping means for yieldably resisting longitudinal movement of said inner member relative to said outer member.

4. A stabilizer for a vehicle steering linkage for connection between a fixed portion of the vehicle and a movable element of the vehicle steering linkage comprising:
   a first cylinder;
   a second cylinder extending longitudinally through one end of said first cylinder and having a first end portion positioned internally of said first cylinder and a second end portion positioned externally of said first cylinder;
   a compression spring located within said first cylinder surrounding said second cylinder;
   means within said first cylinder for compressing said compression spring upon longitudinal movement of said second cylinder away from a predetermined longitudinal position relative to said first cylinder, said means comprising first means for compressing said spring upon longitudinal movement of said second cylinder in one direction relative to said predetermined position and second means for compressing said spring upon longitudinal movement of said second cylinder in the opposite direction relative to said predetermined position.

5. A stabilizer as claimed in claim 4 wherein said second cylinder is filled with fluid and wherein said stabilizer further comprises a piston having fluid restrictor through-ports mounted within said second cylinder and movable relative thereto and a piston rod attached at one end to said piston and extending through said first end portion of said second cylinder with the distal end of said piston rod being affixed to said first cylinder whereby the piston moves through the fluid with resistance as the second cylinder moves longitudinally relative to the first cylinder thereby yieldably resisting longitudinal movement of said second cylinder relative to said first cylinder.

6. A stabilizer as claimed in claim 4 wherein the other end of said first cylinder includes an end wall and wherein said stabilizer further comprises attaching eyes affixed to opposite ends of the stabilizer with one eye being affixed to said second end portion of said second cylinder and with the other eye being affixed to said end wall of said first cylinder.

7. A stabilizer for a vehicle steering linkage for connection between a fixed portion of the vehicle and a movable element of the vehicle steering linkage comprising:
   a first cylinder;
   a second cylinder extending longitudinally through one end of said first cylinder and having a first end portion positioned internally of said first cylinder and a second end portion positioned externally of said first cylinder;
   a compression spring located within said first cylinder surrounding said second cylinder;
   means within said first cylinder for compressing said compression spring upon longitudinal movement of said second cylinder away from a predetermined longitudinal position relative to said first cylinder, said means comprising first means for compressing said spring upon longitudinal movement of said second cylinder in one direction relative to said predetermined position and second means for compressing said spring upon longitudinal movement of said second cylinder in the opposite direction relative to said predetermined position; and
   wherein said first means comprises a first annular projection extending outwardly from said second cylinder and positioned along said second cylinder intermediate its ends, a second annular projection extending inwardly from said first cylinder and positioned along said first cylinder intermediate its ends, a first annular thrust washer means slidably mounted about said second cylinder adjacent said first annular projection and a second annular thrust washer means slidably mounted about said second cylinder adjacent said second annular projection, said spring being longitudinally positioned between said first and second annular thrust washer means whereby the spring urges the thrust washer means toward engagement with the annular projections and inward longitudinal movement of said second cylinder relative to said first cylinder causes said spring to be compressed between said first and second thrust washer means resisting the relative movement of the cylinders.

8. A stabilizer as claimed in claim 7, wherein said second means comprises a third annular projection extending outwardly from said second cylinder adjacent its first end portion and a fourth annular projection extending inwardly from said first cylinder adjacent its one end, said spring being longitudinally positioned between said third and fourth annular projections whereby outward longitudinal movement of said second cylinder relative to said first cylinder causes said spring to be compressed between said first and second annular thrust washer means resisting the relative movement of the cylinders.

9. A stabilizer as claimed in claim 8 wherein said first and third outwardly extending projections are spaced apart and wherein said second and fourth inwardly extending projections are spaced apart a distance substantially equal to the spacing of said first and third projections, said spacing being less than the length of said spring in its non-compressed state and said spring being longitudinally compressed between said first and second annular thrust washer means to urge said thrust washers into engagement with said inwardly and outwardly extending projections, whereby said second cylinder is biased by said spring to a predetermined longitudinal position relative to said first cylinder with said outwardly extending projections substantially radially aligned with said inwardly extending projections.

10. A stabilizer for a vehicle steering linkage for connection between a fixed point on the vehicle and a moving element of the steering linkage, said stabilizer comprising:

a first cylinder having a substantially open end and a substantially closed end;

a fluid filled cylinder projecting longitudinally through the open end of said first cylinder, said fluid filled cylinder being longitudinally movable relative to said first cylinder and having a first end portion positioned internally of said first cylinder and a second end portion positioned externally of said first cylinder;

a piston having fluid restrictor ports extending therethrough, said piston being movably mounted within said fluid filled cylinder and including a piston rod attached at one end to said piston and extending through said one end portion of said fluid filled cylinder, said piston rod being attached at its distal end to the substantially closed end of said first cylinder;

said first cylinder having a pair of spaced apart substantially annular stops extending radially inwardly therefrom and said fluid filled cylinder having a pair of spaced apart substantially annular stops extending radially outwardly therefrom with the space between said inwardly extending stops being substantially the same as the space between said outwardly extending stops, said outwardly extending stops being sized to move past said inwardly extending stops as the fluid filled cylinder moves longitudinally relative to said first cylinder, each of said outwardly extending stops being substantially concentric relative to the corresponding inwardly extending stop when the first end portion of the fluid filled cylinder is substantially at the longitudinal center of the first cylinder;

a compression spring mounted within said first cylinder surrounding said fluid filled cylinder and longitudinally positioned between said inwardly and outwardly extending stops;

first and second annular thrust washer means slidably mounted about said fluid filled cylinder with said first annular thrust washer means being captured between one end of said compression spring and the adjacent inwardly and outwardly extending stops and said second annular thrust washer means being captured between the other end of said compression spring and the adjacent inwardly and outwardly extending stops;

whereby longitudinal displacement of said fluid filled cylinder in either direction relative to said longitudinally centered position is resisted by compression of the spring between the first and second annular thrust washer means and by said piston moving in said fluid filled cylinder, and the spring tends to urge the fluid filled cylinder back to its centered position upon removal of the displacing force.

11. A stabilizer as claimed in claim 10 further comprising a first attaching eye affixed to the second end portion of said fluid filled cylinder and a second attaching eye affixed to the closed end of the first cylinder whereby the stabilizer can be connected between said fixed portion of the vehicle and said movable element of the vehicle steering linkage.

12. A vehicle steering linkage stabilizer comprising:
an inner cylinder;
an outer cylinder positioned in telescoping relationship about said inner cylinder with said inner cylinder having a normal intermediately extended position relative to said outer cylinder;
a first pair of longitudinally spaced stops extending outwardly from said inner cylinder and a second pair of longitudinally spaced stops extending inwardly from the bore of said outer cylinder;
each stop of said first pair of stops being substantially aligned with a corresponding stop of said second pair of stops when said inner cylinder is in said normal position;
said first pair of stops being configured to move past said second pair of stops upon relative longitudinal movement of said inner and outer cylinders;
spring means mounted about said inner cylinder and longitudinally positioned between corresponding ones of said first and second pairs of spaced stops; and
thrust washer means positioned at each end of said spring means and surrounding said inner cylinder whereby relative longitudinal movement of the cylinders causes opposing ones of said first and second pairs of stops to move the thrust washer means closer together compressing the spring means therebetween to resist the movement of the cylinders.

13. The stabilizer of claim 12 wherein said spring means is a coil spring and wherein the spacing between said stops is less than the length of said coil spring in its uncompressed state whereby said coil spring urges said thrust washers into compressive engagement with said stops biasing said inner cylinder to its normal position relative to said outer cylinder.

* * * * *